United States Patent [19]

Rowland

[11] Patent Number: 4,608,119

[45] Date of Patent: Aug. 26, 1986

[54] APPARATUS FOR CONCENTRATING AQUEOUS SOLUTIONS

[75] Inventor: Jack T. Rowland, Grand Island, N.Y.

[73] Assignee: Niagara Blower Company, Buffalo, N.Y.

[21] Appl. No.: 609,596

[22] Filed: May 14, 1984

Related U.S. Application Data

[60] Division of Ser. No. 345,668, Feb. 4, 1982, abandoned, which is a continuation-in-part of Ser. No. 180,320, Aug. 22, 1980, abandoned.

[51] Int. Cl.$^4$ .......................... B01D 1/20; B01D 3/10
[52] U.S. Cl. ........................................ 159/3; 159/31; 159/46; 159/DIG. 2; 159/DIG. 10; 159/DIG. 16; 202/177; 202/197; 202/185 R; 202/200; 202/205; 202/236; 203/14; 203/40; 203/88; 203/90; 203/91
[58] Field of Search ............... 202/197, 200, 205, 182, 202/236, 177, 185.1, 267 R; 203/88, 14, 90, 91, 40; 159/3, DIG. 16, DIG. 22, 48.1, DIG. 10, 31, DIG. 23, 46, 2.1, DIG. 2

[56] References Cited

U.S. PATENT DOCUMENTS

| | | | |
|---|---|---|---|
| 2,778,782 | 1/1957 | Stutz | 202/236 |
| 2,825,680 | 3/1958 | Stutz | 202/200 |
| 2,881,116 | 4/1959 | Siegfried | 202/200 |
| 2,956,934 | 10/1960 | Waddill | 202/200 |
| 3,169,102 | 2/1965 | Weiswurm | 159/DIG. 28 |
| 3,965,005 | 6/1976 | Boyd, Jr. et al. | 202/200 |
| 4,104,112 | 8/1978 | Stutz | 159/48.2 |
| 4,409,064 | 10/1983 | Vora et al. | 159/31 |

FOREIGN PATENT DOCUMENTS 0582597  9/1959  Canada .............................. 202/200

Primary Examiner—S. Leon Bashore
Assistant Examiner—V. Manoharan
Attorney, Agent, or Firm—Niro, Scavone, Haller & Niro, Ltd.

[57] ABSTRACT

An apparatus for concentrating aqueous solutions of hygroscopic organic liquid having boiling points higher than the normal boiling point of water is disclosed. The apparatus includes an airtight evacuated chamber, means for injecting a preheated temperature adjusted solution into the chamber to vaporize water from the solution and produce a concentrated aerosol of organic liquid, and means for coalescing the concentrated aerosol. Also included is a system for recovery of organic vapor leaving the chamber along with the vaporized water.

13 Claims, 3 Drawing Figures

U.S. Patent   Aug. 26, 1986   4,608,119
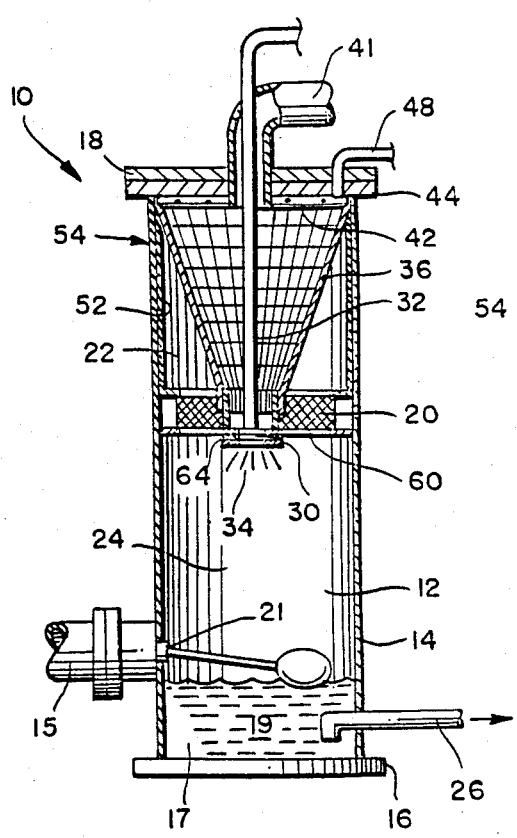
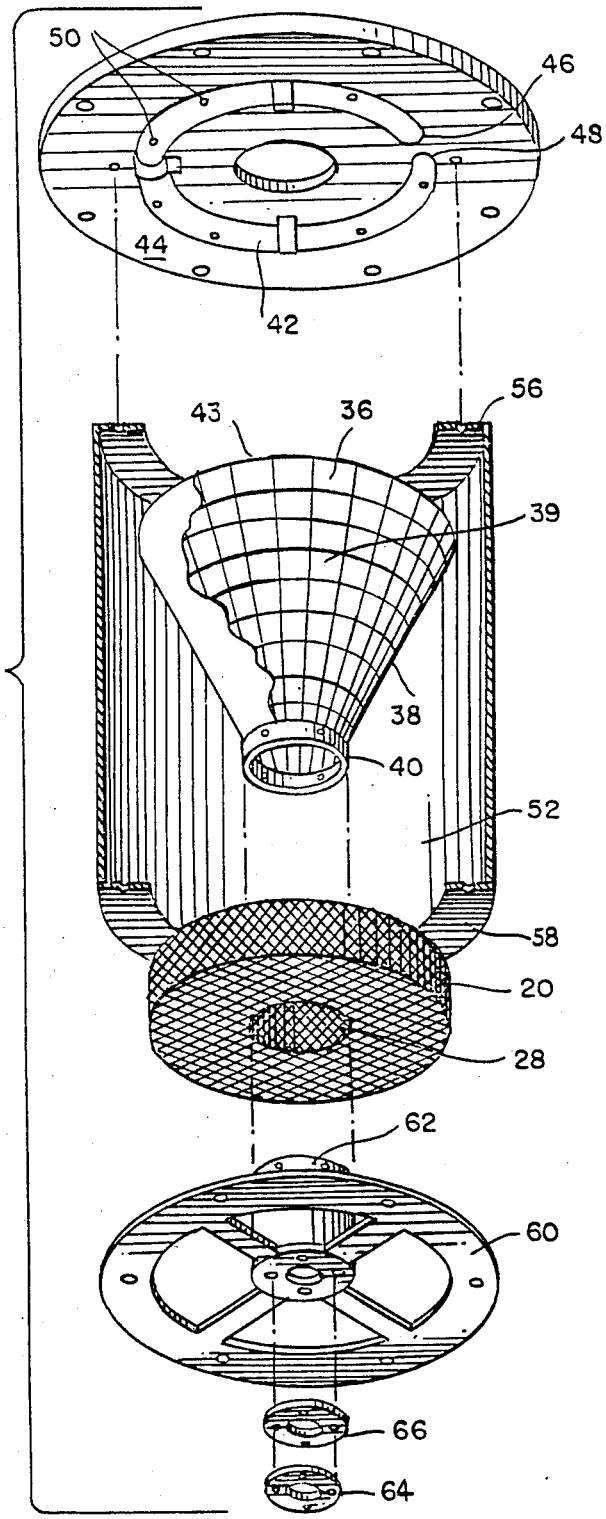

APPARATUS FOR CONCENTRATING AQUEOUS SOLUTIONS

This application is a division of application Ser. No. 345,668, filed Feb. 4, 1982, which in turn is a continuation-in-part of Ser. No. 180,320, filed 8/22/80 both now abandoned.

BACKGROUND OF THE INVENTION

This invention relates generally to a method and apparatus for concentrating aqueous solutions and more particularly concerns an apparatus and method for concentrating aqueous solutions of hygroscopic organic liquids having boiling points higher than the normal boiling point of water. Typical of the organic substances suitable for concentrating according to the present invention are the polyhydroxy organic compounds such as propylene glycol, ethylene glycol, diethylene glycol and triethylene glycol.

The present invention has particular usefulness in conjunction with recirculating aqueous solutions of these hygroscopic organic liquids which become progressively more dilute in dehumidifying and certain anti-freeze applications. Typical of the latter are systems where the solutions are used to flood air cooling coils maintained at subfreezing temperatures to prevent the coils from icing up due to moisture in the air, while absorbing some of this moisture into the solution as a diluent. In this application, as dilution progresses, the anti-freeze effectiveness of the solution decreases to a point where removal of water and reconcentration of the solution is required for further efficient operation of the air cooling operation.

While various techniques have been suggested and are in use for concentrating aqueous anti-freeze solutions, these techniques have many serious shortcomings. For example, since most of these techniques were developed in a bygone era of cheap resources, they are not energy efficient and may require excessive amounts of externally supplied cooling water and steam or electricity. Furthermore, most of these prior concentrating techniques permit the loss of excessive amounts of the hygroscopic organic liquid.

A typical prior approach to concentrating aqueous solutions of hygroscopic organic liquid involves heating these solutions at nearly atmospheric pressure in a simple distillation process to boil off excess water thereby returning the spent solution to the desired concentration of the hygroscopic organic liquid. This approach requires significant amounts of energy to raise the temperature of the hygroscopic organic liquid to boiling. As distillation proceeds, significant amounts of the hygroscopic organic liquid are lost along with the water vapor. Furthermore, additional energy is required to cool the concentrated solution to a temperature low enough to permit it to be used in the desired application. Finally, such high temperature processes tend to degrade many hygroscopic organic liquids.

Another prior art concentrating method entails passing a current of a carrier gas such as air over an extended surface of the solution to be concentrated while maintaining this solution at a relatively low temperature. According to this method, which avoids the high temperatures of distillation, significant amounts of energy are nevertheless required to heat the hygroscopic organic liquid in order to evaporate the higher vapor pressure water into the carrier gas. Furthermore, this technique still loses significant amounts of the hygroscopic organic liquid. Apparatus for carrying out this method usually involves the use of packings and elaborate baffle systems, which can be expensive, bulky, and difficult to build and maintain.

Yet another prior art concentrating apparatus utilizes a series of spray nozzles in lieu of the packing or baffle systems described above to maximize the area of contact between the solution being treated and the carrier gas which is to carry away the unwanted water vapor. U.S. Pat. No. 2,778,782, which illustrates one such device, also utilizes these spray nozzles to draw a slow moving stream of fresh air through the apparatus to act as the carrier gas. This air stream would be expected to produce an insignificant pressure drop of about 0.01 inches of water which is not significantly different from atmospheric pressure and will not noticeably contribute to vaporization at the spray nozzles. Even in systems utilizing fans to push or draw outside air through the system as a carrier gas, pressure drops of only about 1.5 inches of water or about 0.1 of a normal barometric pressure storm change would be produced. Again, this pressure change is not significantly different from atmospheric.

SUMMARY OF THE INVENTION

One of the principal objects of the present invention is therefore to provide a method and apparatus for concentrating aqueous solutions of hygroscopic organic liquids having boiling points higher than the boiling point of water with minimal loss of the organic liquids.

Another object of the present invention is to provide a method and apparatus which is energy efficient and operates at a relatively low temperature to produce a low temperature concentrate.

Yet another object of the present invention is to provide a method and apparatus which does not require the use of packings or elaborate baffle systems and furthermore does not consume large amounts of externally supplied water.

A further object of the present invention is to provide an apparatus and method for concentrating aqueous solutions of hygroscopic organic liquids with minimal degradation of the organic liquid itself.

Other objects and features of the invention will become apparent upon examination of the following specification and drawings, together with the claims. While the invention is described below in connection with preferred or illustrative embodiments, these embodiments are not intended to be exhaustive or limiting of the invention. Rather, the invention is intended to cover any alternatives, modifications, and equivalents that may be included within its spirit and scope as defined by the appended claims.

In one important embodiment, the present invention is directed to an apparatus for concentrating an aqueous solution of a hygroscopic organic liquid which includes an airtight evacuated chamber, means for adjusting the temperature of the solution to a temperature below its boiling point at a predetermined positive pressure but above the boiling point corresponding to the negative pressure prevailing within the chamber, and means for injecting the temperature adjusted solution into the chamber in an aerosol form. As the temperature adjusted solution enters the evacuated chamber, the reduction in pressure from the pre-determined positive pressure causes the solution to vaporize at the prevailing negative pressure until the solution temperature has dropped to the boiling point corresponding to the reduced pressure of the chamber. The heat of evaporation is supplied by this cooling of the solution, which is in aerosol form, thereby producing a concentrated aerosol at a reduced temperature. Means are also provided in the apparatus for coalescing the concentrated aerosol into a concentrated solution and for withdrawing the water vapor from the chamber as a dilute vapor containing very small amounts of the hygroscopic organic component.

In a further embodiment of the apparatus of the present invention, means are provided for carrying the dilute vapor from the chamber to a secondary recovery apparatus for condensing the dilute vapor to a dilute aqueous organic solution and extracting water therefrom to form a secondary concentrated aqueous solution of the hygroscopic organic liquid. Finally, means are provided for combining this secondary solution with the concentrated organic solution in the evacuated chamber to minimize overall loss of the organic liquid from the apparatus.

In another embodiment of the present invention, a method is disclosed for concentrating an aqueous solution of a hygroscopic organic liquid having a boiling point higher than the boiling point of water by:

A. bringing the solution to a temperature below its boilingpoint at a pre-determined positive pressure but above the temperature at which the solution would boil at a pre-determined vacuum;

B. injecting the heated solution in aerosol form into an airtight flash chamber maintained under vacuum to vaporize mostly water from the aerosol thereby producing a concentrated aerosol;

C. withdrawing the solution vapor consisting mostly of water vapor from the chamber; and D. coalescing the concentrated aerosol into droplets whichfall to the bottom of the chamber as a concentrated solution.

Furthermore, secondary recovery of the organic liquid may then be accomplished by:

E. condensing the dilute vapor to a dilute aqueous organic solution;

F. extracting water from the dilute aqueous organic solution to form a secondary concentrated aqueous solution of the hygroscopic organic liquid; and, G. combining the secondary solution with the concentrated solution thereby minimizing loss of the organic liquid.

BRIEF DESCRIPTION OF THE DRAWINGS

FIG. 1 is an elevation view of the flash concentrator of the invention.

FIG. 2 is an exploded view of the top cell of the flash concentrator of FIG. 1.

DETAILED DESCRIPTION OF THE INVENTION

Figure 3:
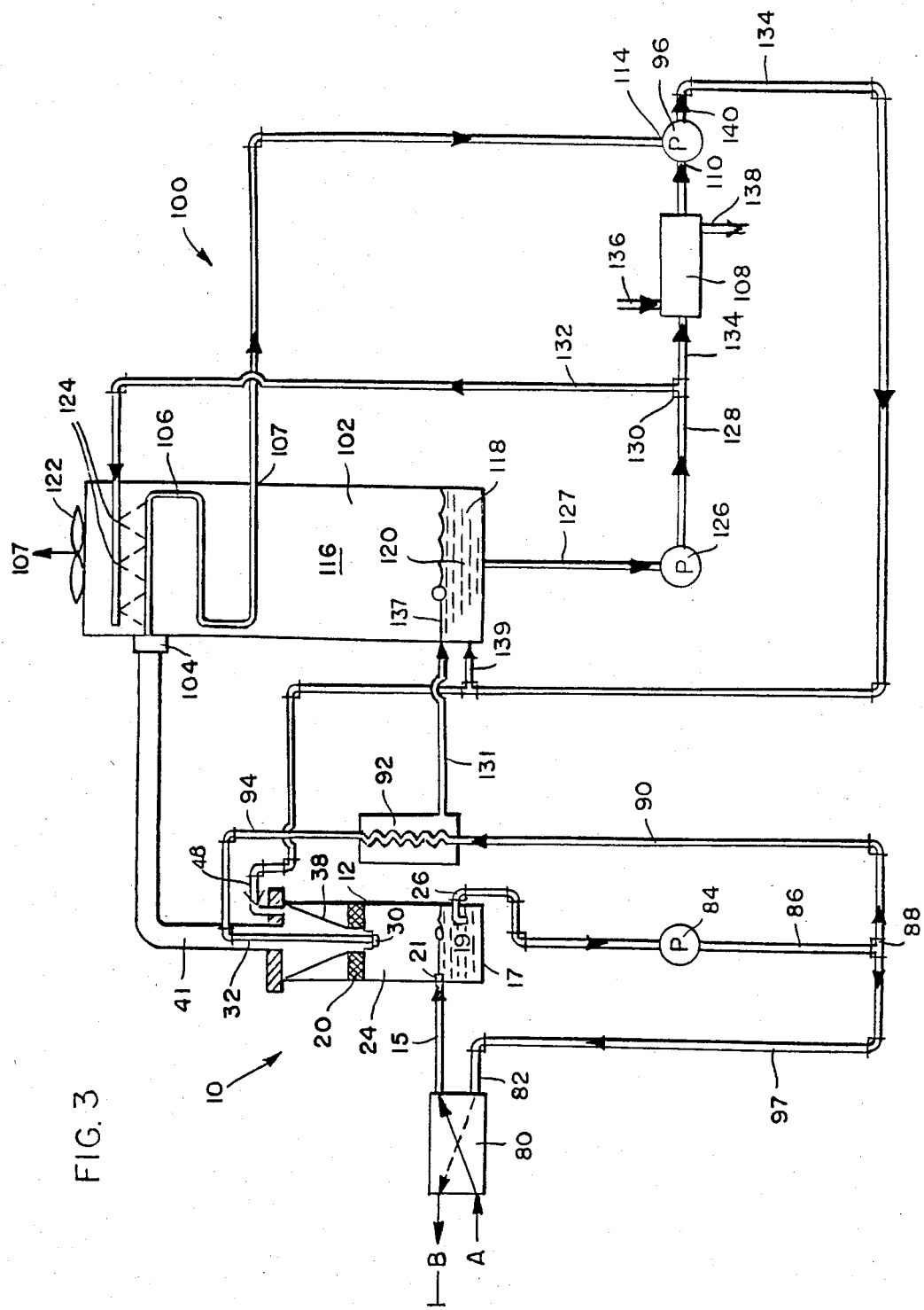
FIG. 3 is a schematic view of a preferred embodiment of the invention portraying the flash concentrator operating in conjunction with the secondary recovery apparatus of the invention.

Turning to FIGS. 1 and 2, there is illustrated a concentrating apparatus in the form of flash concentrator 10. Concentrator 10 comprises a cylindrical chamber 12 within a rigid pressure sealed cylindrical sleeve 14 with base 16 and cap 18. The sleeve, base and cap are made of conventional materials, such as carbon steel, of sufficient thickness to permit evacuation to 1"–4" Hg absolute pressure depending on system requirements. Assembly and sealing of these components is accomplished by conventional means.

The concentrator must be airtight in the sense that, insofar as practically possible, all air is evacuated from chamber 12 or, in other words, there is a zero partial pressure of air in the chamber. The presence of air in the chamber is detrimental because it reduces the ability of the concentrator to satisfy the necessary water vapor—hydrocarbon liquid equilibrium thereby impairing water vapor extraction and slowing the overall concentration process.

In operation, the concentrator will be evacuated to an equilibrium pressure of about 1.0" Hg to about 4.0" Hg depending upon the vapor pressure and temperature of the solution being concentrated. More preferably, the concentrator will be evacuated to about 2.0" Hg to about 4.0" Hg and most preferably it will be operated at about 2.0" Hg. The equilibrium pressure which is referred to here reflects the water vapor and hydrocarbon vapor pressures in the chamber, since it corresponds to the point at which the liquid vapor pressure equals the sum of the water vapor and the hydrocarbon vapor pressures.

The concentrator includes an inlet pipe 15 which admits the organic solution to be concentrated to a concentrator sump 17. Sump 17 receives this incoming solution as well as the concentrated solution falling from coalescing media above to form by the agitation inherent in the operation of the system a generally uniform solution of intermediate organic concentration 19. The actual concentration of this solution is determined by the adjustment of system parameters including particularly the rate that the organic solution enters the sump through a float valve 21 positioned at the inlet point of inlet pipe 15.

A circular pad 20 is positioned transversely to the axis of chamber 12, thereby defining top and bottom cells 22 and 24. Pad 20 serves as a media for coalescing concentrated aerosol particles existing primarily within bottom cell 24 by agglomerating them into droplets which fall by gravity to the sump 17 of the concentrator to be withdrawn through outlet pipe 26. Stainless steel woven mesh where the woven wire has a diameter of 0.11 inches and is specially crimped to give a matt density of about 13.5 pounds per cubic foot has been found to be a particularly useful coalescing media. The weave of this mesh provides a rigorous path for impinging minute aerosol particles without a significant pressure loss between top and bottom cells 22 and 24.

Pad 20 has a central bore 28 to permit spray nozzle 30 and feedtube 32 to be properly mounted in the chamber 12 for injecting an aerosol into bottom cell 24. The spray nozzle, which must be capable of producing a fine spray 34, may be a conventional needle valve or expansion nozzle.

A reflux media 36 with funnel portion 38 and neck 40, is coaxially positioned within top cell 22 with neck 40 positioned within the central bore 28 of pad 20. Reflux media 36 must be able to retain fine liquid particles while passing water vapor with minimal pressure drop for withdrawal from top cell 22 through suction tube 41. One reflux media satisfying these criteria is polypropylene felt with fine denier fibers, randomly matted and needled to achieve stability and strength.

A reflux feed distributor in the form of a circular feed tube 42 clamped to the bottom of reflux cover 44 is positioned just inside the top edge 43 of reflux funnel 38.

Tube 42 is capped at end 46 and has inlet tube 48 at its other end which passes up and out through reflux cover 44. Small diameter orifices 50 are distributed along the outer edge of tube 42 adjacent top edge 43 of reflux funnel 38 to meter liquid flow onto the reflux media 36. This reflux wetting operation will be discussed in greater detail below.

For convenience of assembly, pad 20, nozzle 30, feedline 32, reflux media 36, circular feed tube 42, and reflux cover 44 are assembled into an inner sleeve 52 to form a primary recovery unit 54 which is mounted in top cell 22 of chamber 12. Inner sleeve 52 has top and bottom inwardly directed circumferential lips 56 and 58 and a bottom support member 60 with a hollow axial stem 62. Pad 20 is pressed onto the outside of stem 62 so that it rests upon support member 60 and reflux media neck 40 is then press fit onto the outside of hollow axial stem 62 so that the bottom edge of funnel portion 38 rests upon pad 20. Next, nozzle 30 is sealingly affixed within stem 62 by means of retainer 64 and gasket 66 using bolts, rivets or other conventional joining means.

Turning now to FIG. 3 for an understanding of the operation of concentrator 10, there is illustrated an incoming line A connected to a heat exchange unit 80. This cold incoming dilute aqueous hygroscopic organic liquid is preheated by warm concentrated solution entering the heat exchange unit through line 82 and leaving in a cooler state through output line B for reuse in an external dehumidifying or spray cooling system (not shown). Once preheated, the incoming dilute aqueous solution passes through inlet pipe 15 and float valve 21 into sump 17. During operation of the concentrator, float valve 21 continuously throttles, admitting dilute liquid to the sump as needed. The concentration of the solution 19 in sump 17 is higher than that of the dilute solution entering through line 15 because this liquid is constantly being withdrawn through outlet pipe 26 to be concentrated in the concentrator and returned to the sump.

Solution 19, which may include some water vapor, is withdrawn from sump 17 through outlet pipe 26 by pump 84 and moved in a feedback loop through line 86 to distribution point 88 where a valve or other conventional control device diverts a pre-determined portion of the liquid through line 90 to steam preheater 92. Steam preheater 92, which is located externally of the evacuated chamber, warms the solution to a temperature below its boiling point at the pre-determined positive pressure prevailing there, thereby preventing flashing of water vapor from the solution within line 94 and reducing the heat of evaporation requirements. Once it leaves the preheater 92 through line 94, the solution flows into feedtube 32 and nozzle 30 through which it is injected, in aerosol form, into bottom cell 24. Since the chamber 12 is held at a vacuum, the low boiling water portion of the solution will flash or evaporate in cell 24 drawing heat from the solution until a reduced temperature is reached at which the liquid and vapor phases in solution can exist in equilibrium.

Vacuum conditions are maintained in chamber 12 by vacuum pump 96 which communicates with the chamber through a circuitous path of vacuum lines and tube bundles culminating in suction tube 41. Vaporized water in bottom cell 24 is drawn up through pad 20 by the action of this vacuum pump which concomitantly draws the concentrated aerosol into pad 20. Most of this concentrated aerosol impinges upon the coalescing medium of pad 20 forming larger and larger droplets which eventually fall by gravity into sump 17.

While most of the concentrated aerosol is trapped by the coalescing media of pad 20, a small amount of organic vapor and entrained organic liquid escapes along with the water vapor moving through the pad to contact the outer surface of reflux funnel 38. Reflux funnel 38 is continuously wetted with a dilute aqueous solution of the hygroscopic organic liquid to enable it to selectively absorb and entrap most of the remaining hygroscopic organic material while permitting the water vapor to be drawn through to suction line 41 as a dilute vapor containing traces of the organic liquid. After performing its absorbant function, the reflux liquid flows down the side of the reflux funnel and into the sump 17.

Thus, it is seen that the concentration of the organic liquid in the sump 17 is increased over that of the dilute solution entering through inlet pipe 15. System parameters, such as sump level, rate of pumping, and setting at distribution points may be adjusted to obtain a desired constant level of organic liquid concentration within the sump as well as the desired rate of return of this concentrated liquid through line 97 to the heat exchanger 80 for reuse in an external system (not shown).

Concentrator 10 will permit small quantities of the hygroscopic organic liquid to escape in mixture with the water vapor being drawn through suction line 41. Where economic and other considerations warrant it, a secondary recovery apparatus 100 may be employed in which this dilute vapor is condensed and again concentrated by removing additional water to produce a secondary concentrated aqueous solution of the hygroscopic organic liquid for return to the concentrator system to further minimize losses of the hygroscopic organic liquid.

In this preferred embodiment of the present invention, suction line 41 carries the dilute water vapor to evaporative condenser 102 through input fitting 104 to a tube bundle 106, represented schematically in FIG. 3. Vacuum pump 96 draws the water vapor through line 41 and tube bundle 106 while maintaining a vacuum within these lines of about the same level as is present within the flash evaporator 10. The vapor moving through tube bundle 106 is cooled and condensed within evaporative condenser 102 so that it emerges from the evaporative condenser at point 107 primarily as a dilute aqueous organic solution containing trace amounts of entrained organic vapor.

Pump 96 is a liquid ring vacuum pump of a rotary displacement design having a multi-vaned impeller mounted eccentrically within a cylindrical casing. Prior to operation, the pump casing is partially filled with aqueous liquid which, when the pump is turned on, is thrown to the periphery of the casing by the rotating impeller where it forms a liquid ring which seals the casing and impeller pockets as vapors and liquids are drawn into the pump, compressed and discharged.

Sealant fluid is continuously supplied to the pump through fluid inlet 110. This fluid is drawn from the secondary recovery system 100 and cooled in a shell and tube heat exchanger 108 before entering the pump. Cooling of this fluid enables it to carry off the heat of compression as well as to cool the coexisting liquid and vapor phases of the solution entering suction port 114 of pump 96, thereby further reducing by condensation the very low level of hygroscopic liquid vapor still contained as a fraction of the solution vapor.

Evaporative condenser 102 includes a chamber 116 with condenser sump 118 holding a dilute secondary aqueous solution of the hygroscopic organic liquid 120, and tube bundle 106. A fan 122 is provided for moving a stream of air up through chamber 116 and past the tube bundle to cool and condense the dilute vapor being moved through the tube bundle. The evaporative condenser also includes nozzles 124 positioned to discharge a liquid onto the tube bundle which will evaporate into the air stream produced by fan 122 drawing part of its heat of evaporation from the tube bundle and vapors passing therethrough, thereby improving the cooling efficiency of the condenser.

According to the preferred teaching of the present invention, the liquid supplied to nozzles 124 is the dilute secondary solution 120. This solution is drawn by pump 126 from sump 118 through line 127 and pumped through line 128 with most of the solution then being diverted through valve 130 to line 132 which supplies the spray nozzles. Since this dilute solution contains mostly water with a minor quantity of a higher boiling point organic liquid, the solution component primarily evaporated into the condenser air stream will be water. Thus, further solution concentration is obtained without expenditure of additional energy.

Since this secondary solution must not become too concentrated, the portion recovered by wetting the reflux funnel 38 of the concentrator 10 is replaced by water drawn from various points in the system. For example, water may be obtained from the steam condensate of heater 92 through line 131. The actual amounts of water provided for dilution purposes will depend on system design parameters and preferably will be controlled automatically by a float operated valve 137 in sump 118.

Pump 126 draws secondary solution 120 from evaporative condenser sump 118 into a feedback loop represented by lines 127, 128, 132 and spray nozzles 124. The actual flow within the loop is controlled by valve 130 which diverts part of the solution through line 134 to shell and tube cooler 108 to provide the sealant fluid for pump 96. Shell and tube 108 is of conventional design and includes an external coolant input 136 and a spent coolant output 138.

Vacuum pump 96 thus receives dilute aqueous solution of the organic liquids and non-condensable gases at suction port 114 and secondary more concentrated solution at sealant fluid liquid inlet port 110. The discharge of pump 96 which is directed through seal liquid discharge port 140 is thus a tertiary solution of intermediate concentration derived from these two sources. This tertiary solution with its noncondensables is fed into line 134, and then directed into: 1) evaporative condenser sump 118 through feed line 139 releasing non-condensables to the atmosphere; and, 2) concentrator 10 through circular feed tube 42 of the reflux feed distributor (FIG. 2).

EXAMPLE

A concentrating apparatus according to the teaching of the present invention was devised in which the parameters of flow, concentration and fluid loss were carefully balanced to demonstrate the efficiency of the overall system.

In the system, a recirculating spray cooler designed for operating with a 59 percent solution of propylene glycol at 28° F. was used with the concentrating apparatus. Since the recirculating spray cooler removed 100 pounds/hour (0.2 gallons/minute) of water into the recirculating spray system it was the objective of the concentrating apparatus to remove this 0.2 GPM of water from the propylene glycol solution to maintain the required 59 percent level in the spray cooler system.

The system parameters are set forth in Table I below. An examination of this table will show that the desired 0.2 GPM of water were removed and a concentrated aqueous solution of the hygroscopic organic liquid returned to the spray cooler system.

The present invention thus offers an important new apparatus and method for concentrating aqueous solutions of hygroscopic organic liquids having boiling points higher than the boiling point of water. The system is energy-efficient and operated with minimal losses of the organic liquid.

TABLE I

| Point in System (FIG. 3) | Flow Rate (GPM) | Propylene Glycol Concentration (Percent by Weight) | Temperature (°F.) | Explanation |
| --- | --- | --- | --- | --- |
| Exchanger input (A) | 2.5 | 60 | 30 | From spray cooler* |
| Concentrator input (15) | 2.5 | 60 | 87.8 | Heated in exchanger |
| Concentrator sump (17) | — | 64 | 111.7 | |
| Input to nozzle (30) | 3.9 | 64 | 175 | |
| Concentrator bottom cell (24) | 3.7 | 67 | 128.7 | |
| Concentrator suction line (41) | 0.2 | — | — | Aerosol, chamber at 2" Hg absolute 106 #/hr. H₂O & 2 #/hr. glycol |
| Circular feedtube (42) | 0.01 | — | 77.2 | |
| Evap. condenser output at fan (122) | — | 0.05 | — | |
| Evap. condenser sump (118) | 14.6 | 15 | 92 | |
| Evap. condenser feedline (139) | 2.80 | — | 77.2 | |
| Evap. condenser heater input (131) | 0.01 | — | — | |
| Evap. condenser spray line (132) | 12.0 | — | 92 | |
| Evap. condenser output (107) | 0.21 | — | — | 100.7 #/hr. water (condensed vapor) & 5.3 #/hr. saturated vapor |
| Shell & tube condenser (108) | 2.6 | 15 | 92 | |
| Seal water input (110) | 2.6 | 15 | 77.2 | |
| Vac. pump output (140) | 2.81 | — | 77.2 | |
| Concentrator output (26) | 6.2 | 64 | 111.7 | |
| Heat exchange input (82) | 2.3 | 64 | 111.7 | |
| Heat exchange output (B) | 2.3 | 64 | 45 | |

*After intermediate step in which spray cooler output is combined with a portion of concentrated output to reach 60% level.

I claim:

1. An apparatus for concentrating an aqueous solution of a hygroscopic organic liquid having a boiling point higher than the boiling point of water without substantial loss of the organic liquid, comprising:
   an airtight evacuated chamber;
   means, external to said chamber, for preheating the temperature of the solution to a temperature below its boiling point at a pre-determined positive pressure;
   means for injecting said preheated solution into the chamber as an aerosol; means for maintaining said evacuated chamber at a pressure which would vaporize water from said aerosol to produce a concentrated aerosol, said vaporized water containing residual organic liquid;
   means for coalescing said concentrated aerosol; and
   means for withdrawing said vaporized water from said chamber, through said coalescing means.

2. The concentrating apparatus of claim 1 wherein said injecting means comprises a spray nozzle positioned within said chamber, a conduit in communication with said spray nozzle and emerging from said chamber and a pump for moving said preheated solution through said conduit and said nozzle.

3. The concentrating apparatus of claim 1 wherein said evacuated chamber is cylindrical, said coalescing means comprises a circular pad of woven mesh positioned transversely to the axis of said chamber, said circular pad defining top and bottom cells within said chamber, and said injecting means includes a spray nozzle positioned within said chamber for injecting said preheated solution into said bottom cell as an aerosol whereby water is vaporized from said aerosol and drawn through said pad to said top cell and the resulting concentrated aerosol is coalesced into droplets which fall to the base of said bottom cell.

4. The concentrating apparatus of claim 3 wherein said circular pad is a stainless steel woven mesh having a wire diameter and weave for coalescing said aerosol.

5. The concentrating apparatus of claim 1 including reflux means for removing said residual organic liquid from said vaporized water.

6. The concentrating apparatus of claim 5 wherein said reflux means comprises a continuously wetted filter media, said filter media being positioned within said chamber for contacting said vaporized water before it is withdrawn from said chamber.

7. An apparatus for concentrating an aqueous solution of a hygroscopic organic liquid having a boiling point higher than the boiling point of water without substantial loss of the organic liquid, comprising:
   an airtight evacuated chamber;
   means, external to said chamber, for preheating the solution to a temperature below its boiling point at a pre-determined positive pressure;
   a pad of woven mesh positioned to define top and bottom cells within said chamber;
   a spray nozzle positioned within said chamber for injecting said preheated solution downwardly into said bottom cell as an aerosol; means for maintaining said evacuated chamber at a pressure which would vaporize water from said aerosol to form a concentrated aerosol;
   means for drawing said vaporized water through said pad to said top cell while the concentrated aerosol is coalesced into droplets in said pad, said droplets falling to the bottom of said bottom cell;
   a continuously wetted reflux means positioned within said top cell for contacting said vaporized water to remove residual organic liquid therefrom; and
   means for withdrawing the vaporized water from the top cell after contact with said reflux means.

8. The concentrating apparatus of claim 7 including a conduit for transporting the preheated solution to said nozzle, wherein said pad includes a hollow central core and said conduit and nozzle are sealingly fixed within said core.

9. The concentrating apparatus of claim 7 wherein said reflux means is a polypropylene felt with fine randomly matted and needled denier fibers for retaining fine liquid particulate, said media permitting water vapor to pass therethrough with minimal pressure drop.

10. The concentrating apparatus of claim 7 wherein said chamber is cylindrical and said filter media is conical in shape, said filter media being positioned coaxially within said cylindrical chamber.

11. An apparatus for concentrating an aqueous solution of a hygroscopic organic liquid having a boiling point higher than the boiling point of water without substantial loss of the organic liquid, comprising:
   an evacuated chamber;
   means, external to said chamber, for preheating the solution to a temperature below its boiling point at a pre-determined positive pressure;
   means for injecting said preheated solution into the chamber as an aerosol whereby water is vaporized from said aerosol and a concentrated aerosol of the organic liquid is produced;
   means for coalescing said concentrated aerosol into a concentrated organic solution;
   means for carrying the vaporized water as dilute vapor from said chamber to a secondary recovery means for condensing said dilute vapor to a dilute aqueous organic solution and extracting water therefrom to form a secondary concentrated aqueous solution,
   said secondary recovery means including an evaporative condenser comprising a conduit for containing said dilute vapor, means for moving a stream of air past the conduit to cool and condense said dilute vapor to said dilute aqueous organic solution and means for discharging said dilute aqueous organic solution.

12. The concentration apparatus of claim 11 including means for combining said dilute aqueous organic solution with said secondary concentrated aqueous solution to produce a tertiary solution which is combined with said concentrated organic solution from said concentrated aerosol.

13. The concentrating apparatus of claim 11 wherein said means for carrying said dilute vapor from said chamber and through said secondary recovery means for condensing said dilute vapor to a dilute aqueous organic solution includes a liquid ring vacuum pump, said liquid ring being cooled to condense vaporized organic liquid still remaining in said dilute aqueous organic solution.

* * * * *